United States Patent
Lee et al.

(10) Patent No.: US 9,293,258 B2
(45) Date of Patent: Mar. 22, 2016

(54) MULTILAYER CERAMIC ELECTRONIC COMPONENT INCLUDING INSULATING LAYERS FORMED ON LATERAL AND END SURFACES THEREOF

(71) Applicant: SAMSUNG ELECTRO-MECHANICS CO., LTD., Suwon, Gyunggi-do (KR)

(72) Inventors: Min Gon Lee, Suwon (KR); Hyung Joon Kim, Suwon (KR); Ki Yong Lee, Suwon (KR); Jun Hee Kim, Suwon (KR); Jae Yeol Choi, Suwon (KR)

(73) Assignee: SAMSUNG ELECTRO-MECHANICS CO., LTD., Gyunggi-Do (KR)

( * ) Notice: Subject to any disclaimer, the term of this patent is extended or adjusted under 35 U.S.C. 154(b) by 200 days.

(21) Appl. No.: 13/715,978

(22) Filed: Dec. 14, 2012

(65) Prior Publication Data

US 2014/0160615 A1    Jun. 12, 2014

(30) Foreign Application Priority Data

Dec. 6, 2012   (KR) .......................... 10-2012-0140922

(51) Int. Cl.
  *H01G 4/30*  (2006.01)
  *H01G 4/012*  (2006.01)
  (Continued)

(52) U.S. Cl.
  CPC .................. *H01G 4/30* (2013.01); *H01G 4/012* (2013.01); *H01G 4/232* (2013.01); *H01G 4/12* (2013.01)

(58) Field of Classification Search
  CPC ....... H01G 4/005; H01G 4/012; H01G 4/232; H01G 4/30

USPC .......................... 361/303, 321.2, 306.3, 301.4
See application file for complete search history.

(56) References Cited

U.S. PATENT DOCUMENTS 4,771,520 A  *  9/1988  Tanaka et al. ................ 29/25.42
6,683,782 B2 *  1/2004  Duva ............................ 361/311
(Continued)

FOREIGN PATENT DOCUMENTS

JP     7-122455 A     5/1995
JP    10-106881 A    4/1998
(Continued)

OTHER PUBLICATIONS

Office Action Korean Patent Application No. 10-2012-0140922 dated Jan. 28, 2014 with English translation.
(Continued)

*Primary Examiner* — David M Sinclair
(74) *Attorney, Agent, or Firm* — McDermott Will & Emery LLP

(57) ABSTRACT

A multilayer ceramic electronic component including: a ceramic main body including a dielectric layer and having first and second main surfaces opposing one another, first and second lateral surfaces opposing one another, and first and second end surfaces opposing one another; a first internal electrode formed within the ceramic main body, including a capacitance formation part having an overlap region to form capacitance and a first lead out portion extending from the capacitance formation part so as to be exposed to the first lateral surface; a second internal electrode alternately laminated together with the first internal electrode, having a second lead out portion extending from the capacitance formation part so as to be exposed to the first lateral surface; first and second external electrodes; and insulating layers.

16 Claims, 3 Drawing Sheets

(51) Int. Cl.
*H01G 4/232* (2006.01)
*H01G 4/12* (2006.01)

(56) References Cited

U.S. PATENT DOCUMENTS

| | | | | |
|---|---|---|---|---|
| 6,950,300 | B2 * | 9/2005 | Sutardja | 361/306.3 |
| 7,123,467 | B2 * | 10/2006 | Greier et al. | 361/321.2 |
| 8,098,478 | B2 * | 1/2012 | Niki et al. | 361/303 |
| 8,614,877 | B2 * | 12/2013 | Kim | 361/321.2 |
| 2005/0286203 | A1 * | 12/2005 | Togashi et al. | 361/301.4 |
| 2008/0186652 | A1 | 8/2008 | Lee et al. | |
| 2010/0149769 | A1 | 6/2010 | Lee et al. | |
| 2010/0206624 | A1 * | 8/2010 | Feichtinger | 174/260 |
| 2012/0250217 | A1 * | 10/2012 | Fukunaga et al. | 361/301.4 |

FOREIGN PATENT DOCUMENTS

| | | | | |
|---|---|---|---|---|
| JP | 2004-140183 | A | | 5/2004 |
| JP | 2006086359 | A | * | 3/2006 |
| JP | 2008-193055 | A | | 8/2008 |
| JP | 2009-026872 | A | | 2/2009 |
| JP | 2009-054973 | A | | 3/2009 |
| KR | 10-2010-0068056 | A | | 6/2010 |

OTHER PUBLICATIONS

Decision of Rejection issued in Japanese Application No. 2012-273970 dated Apr. 8, 2014, w/English translation.
Japanese Office Action with Full English Translation issued in Japanese Patent Application No. 2012-273970 mailed Oct. 1, 2013.

* cited by examiner

MULTILAYER CERAMIC ELECTRONIC COMPONENT INCLUDING INSULATING LAYERS FORMED ON LATERAL AND END SURFACES THEREOF

CROSS-REFERENCE TO RELATED APPLICATIONS

This application claims the priority of Korean Patent Application No. 10-2012-0140922 filed on Dec. 6, 2012, in the Korean Intellectual Property Office, the disclosure of which is incorporated herein by reference.

BACKGROUND OF THE INVENTION

1. Field of the Invention

The present invention relates to a multilayer ceramic electronic component in which a short circuit defect between internal electrodes is improved and acoustic noise generated when a voltage is applied is reduced.

2. Description of the Related Art

Electronic components using a ceramic material include a capacitor, an inductor, a piezoelectric element, a varistor, a thermistor, and the like.

Among ceramic electronic components using a ceramic material, a multilayer ceramic capacitor (MLCC) has advantages such as compactness, guaranteed high capacity, and ease of mountability.

An MLCC is a chip-type condenser commonly installed in computers, personal digital assistants, mobile phones, and the like, playing an important role in charging and discharging electricity. An MLCC may have various sizes and lamination forms, according to an intended use and capacity thereof.

In particular, recently, as electronic products have been reduced in size, MLCCs used in electronic products have also been required to be smaller and have a high capacity.

Thus, MLCCs including thinned dielectric layers and internal electrodes so as to have a reduced size and including a large number of dielectric layers to have high capacity have been manufactured.

Meanwhile, an MLCC in which all external electrodes are positioned on a lower surface has been introduced. While this type of MLCC has excellent mounting density and capacity and low equivalent series inductance (ESL), when a ceramic main body is cut, a short circuit defect may easily occur between the internal electrodes due to a thrust phenomenon occurring in internal electrodes facing one another, due to cutting stress.

RELATED ART DOCUMENT (Patent document 1) Korean Patent Laid Open Publication No. 2010-0068056

SUMMARY OF THE INVENTION

An aspect of the present invention provides a multilayer ceramic electronic component in which a short circuit defect between internal electrodes is improved and acoustic noise generated when a voltage is applied is reduced.

According to an aspect of the present invention, there is provided a multilayer ceramic electronic component including: a ceramic main body including a dielectric layer and having first and second main surfaces opposing one another, first and second lateral surfaces opposing one another, and first and second end surfaces opposing one another; a first internal electrode formed within the ceramic main body, including a capacitance formation part having an overlap region to form capacitance and a first lead out portion extending from the capacitance formation part so as to be exposed to the first lateral surface, and exposed to the first and second end surfaces; a second internal electrode alternately laminated together with the first internal electrode with the dielectric layer interposed therebetween, insulated from the first internal electrode, having a second lead out portion extending from the capacitance formation part so as to be exposed to the first lateral surface, and formed to be spaced apart from the first and second end surfaces by a predetermined interval; first and second external electrodes formed to be connected to the first lead out portion and the second lead out portion, respectively; and insulating layers formed on the first lateral surface, the first end surface, and the second end surface of the ceramic main body, respectively.

When a distance between the first and second end surfaces in the length direction of the ceramic main body is L and distances by which the second internal electrode is spaced apart from the first and second end surfaces in the length direction of the ceramic main body are $Lm1$ and $Lm2$, respectively, $0.01 \leq (Lm1+Lm2)/L \leq 0.08$ may be satisfied.

The first and second internal electrodes may be disposed to be perpendicular to a mounting surface of the ceramic main body.

The first external electrode may be formed to extend to one or more of the first main surface, the second main surface, and the second lateral surface of the ceramic main body.

The second external electrode may formed to extend to one or more of the first main surface, the second main surface, and the second lateral surface of the ceramic main body.

The insulating layers may include one or more selected from the group consisting of epoxy, a heat-resistant polymer, glass, and a ceramic.

The insulating layers may be formed to cover the entirety of the exposed portions of the first and second internal electrodes that overlap each other.

The insulating layers may be formed to be lower than the first and second external electrodes measured from the first lateral surface of the ceramic main body.

According to another aspect of the present invention, there is provided a multilayer ceramic electronic component including: a ceramic main body including a dielectric layer and having first and second main surfaces opposing one another, first and second lateral surfaces opposing one another, and first and second end surfaces opposing one another; a first internal electrode formed within the ceramic main body, including a capacitance formation part having an overlap region to form capacitance and a first lead out portion extending from the capacitance formation part so as to be exposed to the first lateral surface, and exposed to the first and second end surfaces; a second internal electrode alternately laminated together with the first internal electrode with the dielectric layer interposed therebetween, insulated from the first internal electrode, having a second lead out portion extending from the capacitance formation part so as to be exposed to the first lateral surface, and formed to be spaced apart from the first and second end surfaces by a predetermined interval; first and second external electrodes formed to be connected to the first lead out portion and the second lead out portion, respectively; and insulating layers formed on the first lateral surface, the first end surface, and the second end surface of the ceramic main body, respectively, wherein a distance by which the second internal electrode is spaced apart from the first and second end surfaces in the length direction of the ceramic main body may range from 1 μm to 150 μm.

When a distance between the first and second end surfaces in the length direction of the ceramic main body is L and distances by which the second internal electrode is spaced apart from the first and second end surfaces in the length direction of the ceramic main body are Lm1 and Lm2, respectively, 0.01≤(Lm1+Lm2)/L≤0.08 may be satisfied.

The first and second internal electrodes may be disposed to be perpendicular to a mounting surface of the ceramic main body.

The first external electrode may be formed to extend to one or more of the first main surface, the second main surface, and the second lateral surface of the ceramic main body.

The second external electrode may formed to extend to one or more of the first main surface, the second main surface, and the second lateral surface of the ceramic main body.

The insulating layers may include one or more selected from the group consisting of epoxy, a heat-resistant polymer, glass, and a ceramic.

The insulating layers may be formed to cover the entirety of the exposed portions of the first and second internal electrodes that overlap each other.

The insulating layers may be formed to be lower than the first and second external electrodes measured from the first lateral surface of the ceramic main body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
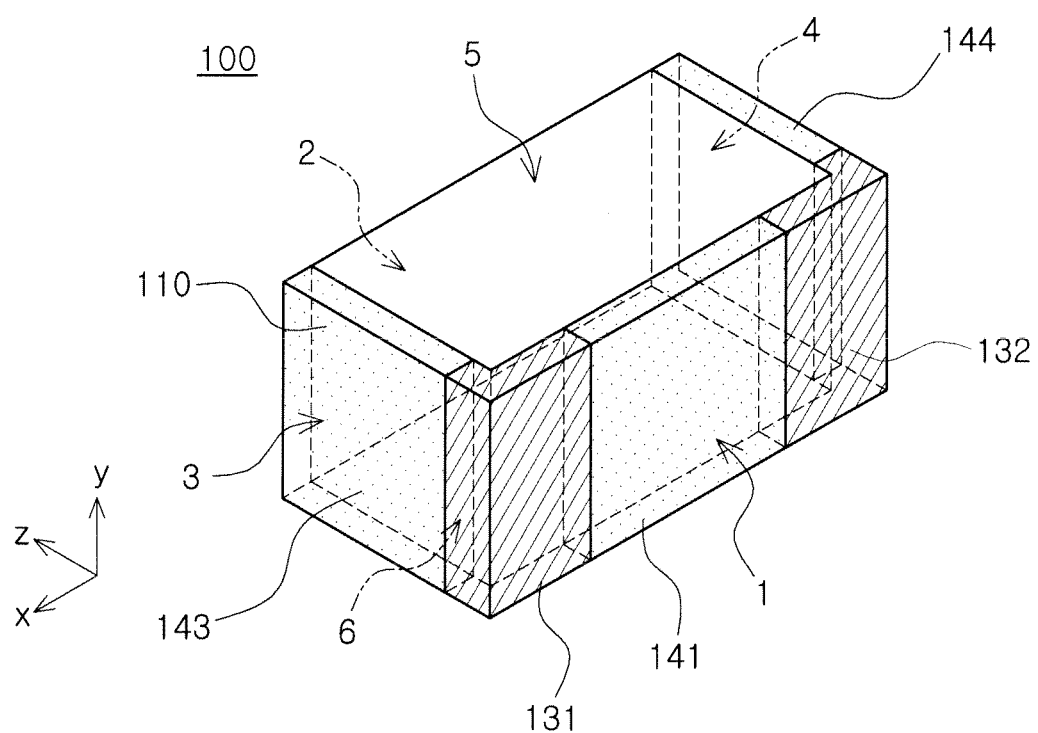
FIG. 1 is a schematic perspective view illustrating a structure of a multilayer ceramic capacitor (MLCC) according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is a schematic perspective view illustrating a structure of a multilayer ceramic capacitor (MLCC) according to an embodiment of the present invention.

Figure 2:
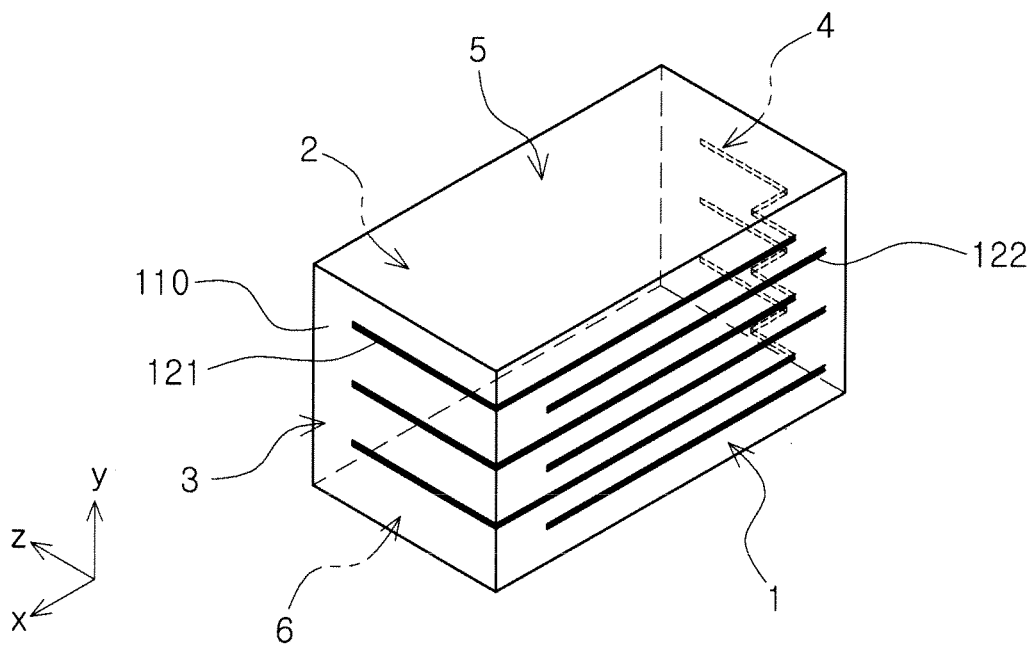
FIG. 2 is a schematic perspective view of a ceramic main body of the MLCC illustrated in FIG. 1.

FIG. 2 is a schematic perspective view of a ceramic main body of the MLCC illustrated in FIG. 1.

Figure 3:
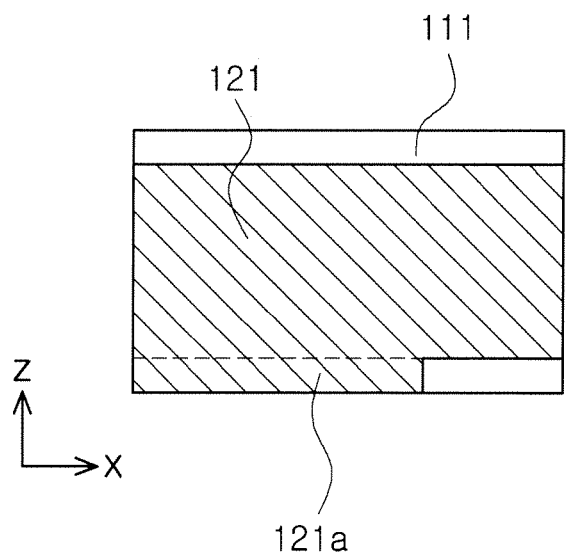
FIG. 3 is a cross-sectional view illustrating a coupling structure of a first internal electrode and a first external electrode in FIG. 1.

FIG. 3 is a cross-sectional view illustrating a coupling structure of a first internal electrode and a first external electrode in FIG. 1.

Figure 4:
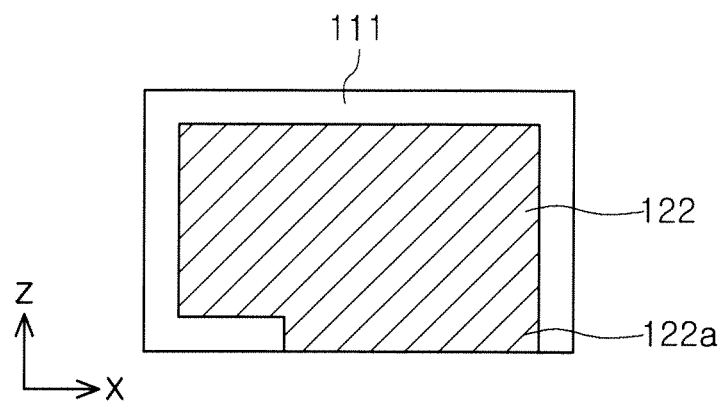
FIG. 4 is a cross-sectional view illustrating a coupling structure of a second internal electrode and a second external electrode in FIG. 1.

FIG. 4 is a cross-sectional view illustrating a coupling structure of a second internal electrode and a second external electrode in FIG. 1.

Figure 5:
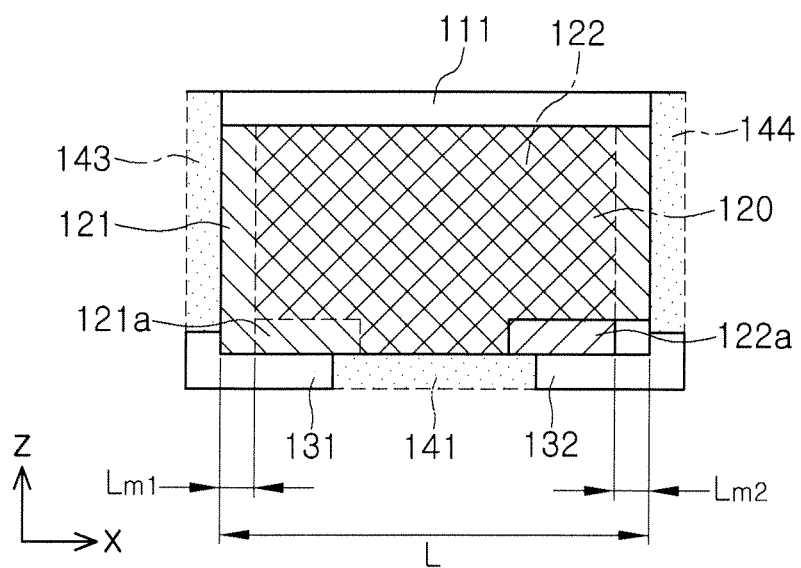
FIG. 5 is a schematic view illustrating a coupling structure of the first and second internal electrodes and first and second external electrodes in FIG. 1.

FIG. 5 is a schematic view illustrating a coupling structure of the first and second internal electrodes and first and second external electrodes in FIG. 1.

A multilayer ceramic capacitor (MLCC) according to the present embodiment may be a 2-terminal vertically laminated capacitor. Here, 'vertically laminated' (or 'vertical multilayer') refers to a configuration in which internal electrodes laminated in a capacitor are disposed to be perpendicular to a mounting region surface of a circuit board and '2-terminal' refers to two terminals connected to a circuit board, as terminals of a capacitor.

Referring to FIGS. 1 through 5, an MLCC 100 according to an embodiment of the present invention may include a ceramic main body 110, internal electrodes 121 and 122 formed within the ceramic main body 110, insulating layers 141, 143, and 144, and external electrodes 131 and 132.

In the present embodiment, the ceramic main body 110 may have a first main surface 5, a second main surface 6, a first lateral surface 1 connecting the first main surface and the second main surface, a second lateral surface 2, a first end surface 3, and a second end surface 4. As illustrated, the ceramic main body 110 may have a hexahedral shape, but the shape of the ceramic main body 110 is not particularly limited. According to an embodiment of the present invention, the first lateral surface 1 of the ceramic main body 110 may be a mounting surface disposed in a mounting region of a circuit board.

According to an embodiment of the present invention, an x direction may be a direction in which the first and second external electrodes are formed to be spaced apart from one another by a predetermined interval, a y direction may be a direction in which internal electrodes are laminated with dielectric layers interposed therebetween, and a z direction may be a direction in which the internal electrodes are mounted on a circuit board.

According to an embodiment of the present invention, the ceramic main body 110 may be formed by laminating a plurality of dielectric layers. The plurality of dielectric layers 111 constituting the ceramic main body 110 are in a sintered state in which adjacent dielectric layers are integrated such that boundaries therebetween may not be readily apparent.

The dielectric layers 111 may be formed by firing ceramic green sheets including ceramic powder, an organic solvent, and an organic binder. The ceramic powder is a material having a high K-dielectric constant (or high permittivity), and as the ceramic powder, for example, a barium titanate ($BaTiO_3$)-based material, a strontium titanate ($SrTiO_3$)-based material, or the like, may be used, but the present invention is not limited thereto.

According to an embodiment of the present invention, internal electrodes may be formed within the ceramic main body 110.

Referring to FIGS. 3 through 5, a first internal electrode 121 having a first polarity and a second internal electrode 122 having a second polarity may be paired, and the pair of first internal electrodes 121 and the second internal electrodes 122 may be disposed in the y direction, such that they face one another with one dielectric layer 111 interposed therebetween.

According to an embodiment of the present invention, the first and second internal electrodes 121 and 122 may be disposed vertically on a mounting surface, i.e., on the first lateral surface 1, of the MLCC.

In an embodiment of the present invention, 'first' and 'second' may refer to different electrical charge polarities.

According to an embodiment of the present invention, the first and second internal electrodes 121 and 122 may be formed with a conductive paste including a conductive metal.

The conductive metal may be nickel (Ni), copper (Cu), palladium (Pd), or an alloy thereof.

The internal electrode layers may be formed by printing the conductive paste on ceramic green sheets constituting the dielectric layers through a printing method such as a screen printing method or a gravure printing method.

The ceramic green sheets with the internal electrode layers printed thereon may be alternately laminated and fired to form the ceramic main body.

The MLCC 100, according to an embodiment of the present invention may include: the first internal electrode 121 formed within the ceramic main body, including the capacitance formation part 120 having an overlap region to form capacitance, and a first lead out portion 121a extending from the capacitance formation part 120 so as to be exposed to the first lateral surface 1, and exposed to the first and second end surfaces 3 and 4; and the second internal electrode 122 alternately laminated together with the first internal electrode 121 with the dielectric layer 111 interposed therebetween, insulated from the first internal electrode 121, having a second lead out portion 122a extending from the capacitance formation part 120 so as to be exposed to the first lateral surface 1, and formed to be spaced apart from the first and second end surfaces 3 and 4 by a predetermined interval.

The first internal electrode 121 is formed to be exposed on the first and second end surfaces 3 and 4, while the second internal electrode 122 is formed to be spaced apart from the first and second end surfaces 3 and 4, thereby improving short circuit defects between the internal electrodes due to a thrust phenomenon of the mutually facing internal electrodes due to stress when the ceramic main body 110 is cut.

In detail, since the first internal electrode 121 formed to be exposed to the first and second end surfaces 3 and 4 in a length direction of the ceramic main body 110 and the second internal electrode 122 formed to be spaced apart from the first and second end surfaces 3 and 4 are alternately laminated, short circuit defects between the internal electrodes can be improved.

In order to be connected to external electrodes having different polarities, the first and second internal electrodes 121 and 122 have the first and second lead out portions 121a and 122a, respectively, and the first and second lead out portions 121a and 122a may be exposed to the first lateral surface 1 of the ceramic main body 110.

According to an embodiment of the present invention, the MLCC is a vertically laminated MLCC, and the first and second lead out portions 121a and 122a may be exposed to the same surface of the ceramic main body 110.

According to an embodiment of the present invention, the lead out portions 121a and 121b of the internal electrodes 121 and 122 may refer to regions, of conductive patterns, having increased widths W and being exposed to one surface of the ceramic main body 110.

The first and second internal electrodes 121 and 122 form capacitance by overlap regions thereof, and the first and second lead out portions 121a and 122a connected to external electrodes having different polarities do not have an overlap region.

Since the first and second lead out portions 121a and 122a are insulated, without overlapping, a short circuit defect between the internal electrodes due to a thrust phenomenon of mutually facing internal electrodes due to cutting stress when the ceramic main body 110 is cut may be improved.

Since the first lead out portion 121a and the second lead out portion 122a do not overlap, the first internal electrode 121 and the second internal electrode 122 may be insulated.

Referring to FIG. 5, when a distance between the first and second end surfaces 3 and 4 in the length direction of the ceramic main body 110 is L and distances by which the second internal electrode 122 is spaced apart from the first and second end surfaces 3 and 4 in the length direction of the ceramic main body 110 are Lm1 and Lm2, respectively, $0.01 \leq (Lm1+Lm2)/L \leq 0.08$ may be satisfied.

Since the distance L between the first and second end surfaces 3 and 4 in the length direction of the ceramic main body 110 and the distances Lm1 and Lm2 by which the second internal electrode 122 is spaced apart from the first and second end surfaces 3 and 4 in the length direction of the ceramic main body 110 are adjusted to satisfy $0.01 \leq (Lm1+Lm2)/L \leq 0.08$, capacitance can be increased and short circuits can be reduced.

As described above, the effect of increasing capacitance results from the increase in the overlap regions of the first internal electrode 121 and the second internal electrode 122, and the effect of reducing short circuits results from laminating the first internal electrode 121 formed to expose the first and second end surfaces 3 and 4 and the second internal electrode 122 formed to be spaced apart from the first and second end surfaces 3 and 4.

If $(Lm1+Lm2)/L$ was less than 0.01, the distances by which the second internal electrodes 122 were spaced apart from the first and second end surfaces 3 and 4 would be small enough to cause a short circuit between the internal electrodes.

If $(Lm1+Lm2)/L$ exceeded 0.08, overlap regions of the first internal electrode 121 and the second internal electrode 122 would be too reduced to obtain an effect of increasing capacitance.

Referring to FIGS. 3 and 5, the first external electrode 131 may be formed to be connected to the first lead out portion 121a of the first internal electrode 121 led to the first lateral surface 1 of the ceramic main body 110, and the second external electrode 132 may be formed to be connected to the second lead out portion 122a of the second internal electrode 122 led to the first lateral surface 1 of the ceramic main body 110.

The first external electrode 131 may be formed on the first lateral surface 1 of the ceramic main body 110 so as to be connected to the first lead out portion 121a and may extend to the first end surface 3 of the ceramic main body 110, but the present invention is not limited thereto.

Also, the second external electrode 132 may be formed on the first lateral surface 1 of the ceramic main body 110 so as to be connected to the second lead out portion 122a and may extend to the second end surface 4 of the ceramic main body 110, but the present invention is not limited thereto.

Namely, the first external electrode 131 may be formed to extend to one or more of the first main surface 5, the second main surface 6, and the second lateral surface 2 of the ceramic main body 110.

Also, the second external electrode 132 may formed to extend to one or more of the first main surface 5, the second main surface 6, and the second lateral surface 2 of the ceramic main body 110.

Thus, according to an embodiment of the present invention, the first external electrode 131 may be connected to the first lead out portion 121a of the first internal electrode 121 led out to the first lateral surface 1 of the ceramic main body 110 and surround one end portion of the ceramic main body 110 in the length direction of the ceramic main body 110.

Also, the second external electrode 132 may be connected to the second lead out portion 122a of the second internal electrode 122 led out to the first lateral surface 1 of the ceramic main body 110 and surround the other end portion of the ceramic main body 110 in the length direction of the ceramic main body 110.

The first and second external electrodes 131 and 132 may be formed with a conductive paste including a conductive metal.

The conductive metal may be a nickel (Ni), copper (Cu), tin (Sn), or an alloy thereof, but the present invention is not limited thereto.

The conductive paste may further include an insulating material and, in this case, the insulating material may be, for example, glass, but the present invention is not limited thereto.

A method for forming the first and second external electrodes 131 and 132 is not particularly limited. The first and second external electrodes 131 and 132 may be formed by dipping the ceramic main body 110, or any other method, such as plating, or the like, may also be used.

Meanwhile, according to an embodiment of the present invention, as illustrated in FIG. 5, the insulating layers 141, 143, and 144 may be formed on the first lateral surface 1, the first end surface 3, and the second end surface 4 of the ceramic main body 110.

The insulating layer 141 formed on the first lateral surface 1 may be formed between the first and second external electrodes 131 and 132.

The insulating layer 141 formed on the first lateral surface 1 may cover the first lead out portion 121a exposed to the first lateral surface 1, and may also cover the entirety of the overlap regions of the first and second internal electrodes 121 and 122.

According to an embodiment of the present invention, as illustrated in FIG. 5, the insulating layer 141 formed on the first lateral surface 1 may completely fill a portion between the first and second external electrodes 131 and 132 on one surface of the ceramic main body 110.

Also, although not shown, according to an embodiment of the present invention, the first insulating layer 141 formed on the first lateral surface 1 may only cover the first lead out portion 121a and may be formed to be spaced apart from the first and the second external electrodes 131 and 132 by a predetermined interval.

Meanwhile, the insulating layers 143 and 144 may be formed to cover the entirety of exposed portions of the first internal electrode 121.

According to an embodiment of the present invention, a height of the first insulating layer 141 formed on the first lateral surface 1 may be lower than the first external electrode 131 or the second external electrode 132. The height of the insulating layer 141 and the external electrodes 131 and 132 may be measured based on the mounting surface, i.e., the first lateral surface 1.

According to an embodiment of the present invention, since the height of the insulating layer 141 formed on the first lateral surface 1 is lower than the height of the first and second external electrodes 131 and 132, the MLCC 100 may be more stably mounted on a circuit board.

Also, the first and second external electrodes 131 and 132 may be formed on portions of the first lateral surface 1 of the ceramic main body 110.

The insulating layers 141, 143, and 144 may include, for example, one or more selected from the group consisting of epoxy, a heat-resistant polymer, glass, and a ceramic, but the present invention is not limited thereto.

According to an embodiment of the present invention, the insulating layers 141, 143, and 144 may be formed of ceramic slurry.

A formation position and height of the insulating layers 141, 143, and 144 may be adjusted by adjusting an amount and a shape of the ceramic slurry.

After the ceramic main body 110 is formed through a firing process, the insulating layers 141, 143, and 144 may be formed by coating ceramic slurry on the ceramic main body 110 and subsequently firing the same.

Alternatively, the ceramic slurry for forming an insulating layer may be formed on ceramic green sheets forming the ceramic main body 110 and fired together therewith to thus form the insulating layers 141, 143, and 144.

A method for forming the ceramic slurry is not particularly limited. For example, the ceramic slurry may be jetted according to a spraying method or may be coated by using a roller.

The insulating layer 141 formed on the first lateral surface 1 may cover the first lead out portion 121a exposed to one surface of the ceramic main body 110 to prevent a short circuit between the internal electrodes and an internal defect such as a degradation of moisture resistance characteristics, or the like.

A multilayer ceramic electronic component according to another embodiment of the present invention may include the ceramic main body 110 including the dielectric layer 111 and having the first and second main surfaces 5 and 6 opposing one another, the first and second lateral surfaces 1 and 2 opposing one another, and the first and second end surfaces 3 and 4 opposing one another; the first internal electrode 121 formed within the ceramic main body, including the capacitance formation part 120 having an overlap region to form capacitance, and a first lead out portion 121a extending from the capacitance formation part 120 so as to be exposed to the first lateral surface 1, and exposed to the first and second end surfaces 3 and 4; the second internal electrode 122 alternately laminated together with the first internal electrode 121 with the dielectric layer 111 interposed therebetween, insulated from the first internal electrode 121, having a second lead out portion 122a extending from the capacitance formation part 120 so as to be exposed to the first lateral surface 1, and formed to be spaced apart from the first and second end surfaces 3 and 4 by a predetermined interval; the first and second external electrodes 131 and 132 formed to be connected to the first lead out portion 121a and the second lead out portion 122a, respectively; and the insulating layers 141, 143, and 144 formed on the first lateral surface 1, the first end surface 3, and the second end surface 4 of the ceramic main body 110, respectively, wherein a distance by which the second internal electrode 122 is spaced apart from the first and second end surfaces 3 and 4 in the length direction of the ceramic main body 110 may range from 1 μm to 150 μm.

When a distance between the first and second end surfaces 3 and 4 in the length direction of the ceramic main body 110 is L and distances by which the second internal electrode 122 is spaced apart from the first and second end surfaces 3 and 4 in the length direction of the ceramic main body 110 are Lm1 and Lm2, respectively, $0.01 \leq (Lm1+Lm2)/L \leq 0.08$ may be satisfied.

The first and second internal electrodes 121 and 122 may be disposed to be perpendicular to a mounting surface of the ceramic main body 110.

The first external electrode 131 may be formed to extend to one or more of the first main surface 5, the second main surface 6, and the second lateral surface 2 of the ceramic main body 110.

The second external electrode 132 may formed to extend to one or more of the first main surface 5, the second main surface 6, and the second lateral surface 2 of the ceramic main body 110.

The insulating layers 141, 143, and 144 may include one or more selected from the group consisting of epoxy, a heat-resistant polymer, glass, and a ceramic.

The insulating layers 141, 143, and 144 may be formed to cover the entirety of the exposed portions of the first and second internal electrodes 121 and 122 that overlap each other.

The insulating layers 141, 143, and 144 may be formed to be lower than the first and second external electrodes 131 and 132 measured from the first lateral surface 1 of the ceramic main body 110.

Elements different from those of the foregoing embodiment of the present invention will be mainly described, and a detailed description of the same elements will be omitted.

In the MLCC 100 according to an embodiment of the present invention, a distance by which the second internal electrode 122 is spaced apart from the first and second end surfaces 3 and 4 in the length direction of the ceramic main body 110 may range from 1 μm to 150 μm.

In this manner, since the distance by which the second internal electrode 122 is spaced apart from the first and second end surfaces 3 and 4 in the length direction of the ceramic main body 110 is regulated to range from 1 μm to 150 μm, a short circuit defect between the internal electrodes due to a thrust phenomenon of the mutually facing internal electrodes due to cutting stress when the ceramic main body 110 is cut may be improved.

In detail, the first internal electrode 121 is formed to be exposed on the first and second end surfaces 3 and 4, while the second internal electrode 122 is formed to be spaced apart from the first and second end surfaces 3 and 4 by a predetermined interval, thereby improving a short circuit defect between the internal electrodes due to a thrust phenomenon of the mutually facing internal electrodes due to stress when the ceramic main body 110 is cut.

Namely, since the first internal electrode 121 formed to be exposed to the first and second end surfaces 3 and 4 in a length direction of the ceramic main body 110 and the second internal electrode 122 formed to be spaced apart from the first and second end surfaces 3 and 4 by a predetermined interval are alternately laminated, a short circuit defect between the internal electrodes can be improved.

If the distance by which the second internal electrode 122 is spaced apart from the first and second end surfaces 3 and 4 in the length direction of the ceramic main body 110 is less than 1 μm, the distance is small enough to cause a short circuit defect between the internal electrodes.

If the distance by which the second internal electrode 122 is spaced apart from the first and second end surfaces 3 and 4 in the length direction of the ceramic main body 110 exceeds 150 μm, overall regions of the first internal electrode 121 and the second internal electrode 122 are too reduced to have an effect of increasing capacitance.

Table 1 below shows the comparison of relative capacitance, a short circuit rate, and a moisture load resistance defect rates according to the distance L between the first and second end surfaces 3 and 4 in the length direction of the ceramic main body 110 and the distances Lm1 and Lm2 by which the second internal electrode 122 is spaced apart from the first and second end surfaces 3 and 4 in the length direction of the ceramic main body 110 in the MLCC according to an embodiment of the present invention.

The relative capacitance refers to a percentage value of capacitance of the MLCC according to an embodiment of the present invention in comparison to capacitance of general MLCC.

As for the capacitance and the short circuit rate, capacitances of samples were measured after applying a 4V voltage thereto, and when the samples were short-circuited and electrically connected, those were determined have a short circuit.

As for the moisture load resistance defect rate, insulation resistances of the respective samples were measured at a temperature of 80□ under conditions of 80% relative humidity for 24 hours, and those having a short circuit were determined to be defective.

The samples were selected based on 0603-sized products (0.6 mm×0.3 mm×0.3 mm) having a capacitance of 2.2 μF.

TABLE 1

|   | (Lm1 + Lm2)/L | Relative capacitance (%) | Short circuit rate (%) | Moisture load resistance defect rate (%) |
|---|---|---|---|---|
| *1 | 0.0005 | — | 100 | — |
| *2 | 0.001 | 107 | 81 | 100 |
| *3 | 0.002 | 107 | 13 | 18 |
| *4 | 0.005 | 108 | 9 | 13 |
| 5 | 0.01 | 106 | 2 | 8 |
| 6 | 0.02 | 103 | 1 | 0 |
| 7 | 0.05 | 99 | 0 | 0 |
| 8 | 0.06 | 96 | 0 | 0 |
| 9 | 0.07 | 95 | 1 | 0 |
| 10 | 0.08 | 93 | 0 | 0 |

*Comparative example
—: Unmeasurable

Referring to Table 1 shown above, it can be seen that when the MLCC according to an embodiment of the present invention is outside of the numeral value ranges of the present invention, the short circuit rate and the moisture load resistance defect rate thereof were increased.

Meanwhile, it can be seen that when the MLCC according to an embodiment of the present invention satisfies the numeral value ranges of the present invention, the short circuit rate and the moisture load resistance defect rate thereof were reduced.

Table 2 below shows the comparison of relative capacitance, a short circuit rate, and a moisture load resistance defect rate according to distances by which the second internal electrode 122 is spaced apart from the first and second end surfaces 3 and 4 in the length direction of the ceramic main body 110 in the MLCC according to another embodiment of the present invention.

The relative capacitance refers to a percentage value of capacitance of the MLCC according to another embodiment of the present invention in comparison to capacitance of general MLCC.

As for the capacitance and the short circuit rate, capacitances of samples were measured after applying a 4V voltage thereto, and when the samples were short-circuited and electrically connected, those were determined have a short circuit.

As for the moisture load resistance defect rate, insulation resistances of the respective samples were measured at a temperature of 80□ under conditions of 80% relative humidity for 24 hours, and those having a short circuit were determined to be defective.

The samples were selected based on products having a length×width×height of 2.0 mm×1.25 mm×1.25 mm and capacitance of 47 μF.

TABLE 2

| | Distance by which second internal electrode is spaced apart from first and second end surfaces (μm) | Relative capacitance (%) | Short circuit rate (%) | Moisture load resistance defect rate (%) |
|---|---|---|---|---|
| *1 | 0.1 | — | 100 | — |
| *2 | 0.2 | — | 100 | — |
| *3 | 0.5 | 112 | 73 | 100 |
| 4 | 1 | 113 | 21 | 8 |
| 5 | 2 | 113 | 15 | 0 |
| 6 | 5 | 112 | 12 | 0 |
| 7 | 10 | 108 | 0 | 0 |
| 8 | 50 | 106 | 1 | 0 |
| 9 | 100 | 101 | 0 | 0 |
| 10 | 150 | 94 | 0 | 0 |
| *11 | 200 | 91 | 2 | 0 |

*Comparative example
—: Unmeasurable

Referring to Table 2 shown above, it can be seen that when the MLCC according to another embodiment of the present invention is outside of the numeral value ranges of the present invention, a degradation of the relative capacitance or the short circuit rate, and the moisture load resistance defect rate thereof were increased.

Meanwhile, it can be seen that when the MLCC according to another embodiment of the present invention satisfied the numeral value ranges of the present invention, capacitance was increased and the short circuit rate and the moisture load resistance defect rate thereof were reduced.

According to an embodiment of the present invention, the overlap regions are even formed in the portions of the first and second internal electrodes exposed to the lateral surface, increasing capacitance of the MLCC.

Also, since the first and second internal electrodes are alternately exposed to one lateral surface of the ceramic main body, a short circuit defect between the internal electrodes can be improved.

Also, since the distance between the first and second internal electrodes to which voltages having different polarities are applied is shortened, a current loop can be reduced, and thus, equivalent series inductance (ESL) can be lowered.

As set forth above, according to an embodiment of the present invention, since the first internal electrode is exposed to the end surface of the ceramic main body and the second internal electrode is not exposed, a short circuit defect between the internal electrodes can be improved.

According to an embodiment of the present invention, since overlap regions of the first and second internal electrodes forming the capacitance formation part are increased, capacity of the multilayer ceramic capacitor can be increased.

Also, since the distance between the first and second internal electrodes to which voltages having different polarities are applied is reduced, a current loop can be shortened, and thus, equivalent series inductance (ESL) can be lowered.

In addition, according to an embodiment of the present invention, a mounting area of the multilayer ceramic capacitor on a printed circuit board can be minimized and acoustic noise can be significantly reduced.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic main body including a dielectric layer and having first and second main surfaces opposing one another, first and second lateral surfaces opposing one another, and first and second end surfaces opposing one another;
a first internal electrode formed within the ceramic main body, including a capacitance formation part having an overlap region to form capacitance and a first lead out portion extending from the capacitance formation part so as to be exposed to the first lateral surface, and exposed to the first and second end surfaces;
a second internal electrode alternately laminated together with the first internal electrode with the dielectric layer interposed therebetween, insulated from the first internal electrode, having a second lead out portion extending from the capacitance formation part so as to be exposed to the first lateral surface, and formed to be spaced apart from the first and second end surfaces by a predetermined interval;
first and second external electrodes formed to be connected to the first lead out portion and the second lead out portion, respectively; and
insulating layers formed on the first lateral surface, the first end surface, and the second end surface of the ceramic main body, respectively,
wherein the first external electrode is formed on a first outer area of the first lateral surface, and the second external electrode is formed on a second outer area of the first lateral surface opposing the first external electrode, the first and second outer areas being arranged on opposite sides of a center line dividing the first lateral surface, and
wherein the insulating layer which is formed on the first lateral surface is formed between the first and second external electrodes so as to intersect the center line and covers at least one of the exposed areas of the first and second lead out portions.

2. The multilayer ceramic electronic component of claim 1, wherein when a distance between the first and second end surfaces in the length direction of the ceramic main body is L and distances by which the second internal electrode is spaced apart from the first and second end surfaces in the length direction of the ceramic main body are Lm1 and Lm2, respectively, $0.01 \leq (Lm1+Lm2)/L \leq 0.08$ is satisfied.

3. The multilayer ceramic electronic component of claim 1, wherein the first and second internal electrodes are disposed to be perpendicular to a mounting surface of the ceramic main body.

4. The multilayer ceramic electronic component of claim 1, wherein the first external electrode is formed to extend to one or more of the first main surface, the second main surface, and the second lateral surface of the ceramic main body.

5. The multilayer ceramic electronic component of claim 1, wherein the second external electrode is formed to extend to one or more of the first main surface, the second main surface, and the second lateral surface of the ceramic main body.

6. The multilayer ceramic electronic component of claim 1, wherein the insulating layers include one or more selected from the group consisting of epoxy, a heat-resistant polymer, glass, and a ceramic.

7. The multilayer ceramic electronic component of claim 1, wherein the insulating layers are formed to cover the entirety of the exposed portions of the first and second internal electrodes that overlap each other.

8. The multilayer ceramic electronic component of claim 1, wherein the insulating layers are formed to be lower than the first and second external electrodes measured from the first lateral surface of the ceramic main body.

9. A multilayer ceramic electronic component comprising:
a ceramic main body including a dielectric layer and having first and second main surfaces opposing one another, first and second lateral surfaces opposing one another, and first and second end surfaces opposing one another;
a first internal electrode formed within the ceramic main body, including a capacitance formation part having an overlap region to form capacitance and a first lead out portion extending from the capacitance formation part so as to be exposed to the first lateral surface, and exposed to the first and second end surfaces;
a second internal electrode alternately laminated together with the first internal electrode with the dielectric layer interposed therebetween, insulated from the first internal electrode, having a second lead out portion extending from the capacitance formation part so as to be exposed to the first lateral surface, and formed to be spaced apart from the first and second end surfaces by a predetermined interval;
first and second external electrodes formed to be connected to the first lead out portion and the second lead out portion, respectively; and
insulating layers formed on the first lateral surface, the first end surface, and the second end surface of the ceramic main body, respectively, wherein a distance by which the second internal electrode is spaced apart from the first and second end surfaces in the length direction of the ceramic main body ranges from 1 μm to 150 μm,
wherein the first external electrode is formed on a first outer area of the first lateral surface, and the second external electrode is formed on a second outer area of the first lateral surface opposing the first external electrode, the first and second outer areas being arranged on opposite sides of a center line dividing the first lateral surface, and
wherein the insulating layer which is formed on the first lateral surface is formed between the first and second external electrodes so as to intersect the center line and covers at least one of the exposed areas of the first and second lead out portions.

10. The multilayer ceramic electronic component of claim 9, wherein when a distance between the first and second end surfaces in the length direction of the ceramic main body is L and distances by which the second internal electrode is spaced apart from the first and second end surfaces in the length direction of the ceramic main body are Lm1 and Lm2, respectively, $0.01 \leq (Lm1+Lm2)/L \leq 0.08$ is satisfied.

11. The multilayer ceramic electronic component of claim 9, wherein the first and second internal electrodes are disposed to be perpendicular to a mounting surface of the ceramic main body.

12. The multilayer ceramic electronic component of claim 9, wherein the first external electrode is formed to extend to one or more of the first main surface, the second main surface, and the second lateral surface of the ceramic main body.

13. The multilayer ceramic electronic component of claim 9, wherein the second external electrode is formed to extend to one or more of the first main surface, the second main surface, and the second lateral surface of the ceramic main body.

14. The multilayer ceramic electronic component of claim 9, wherein the insulating layers include one or more selected from the group consisting of epoxy, a heat-resistant polymer, glass, and a ceramic.

15. The multilayer ceramic electronic component of claim 9, wherein the insulating layers are formed to cover the entirety of the exposed portions of the first and second internal electrodes that overlap each other.

16. The multilayer ceramic electronic component of claim 9, wherein the insulating layers are formed to be lower than the first and second external electrodes measured from the first lateral surface of the ceramic main body.

* * * * *